United States Patent
Ra et al.

(10) Patent No.: US 9,515,919 B2
(45) Date of Patent: Dec. 6, 2016

(54) METHOD AND APPARATUS FOR PROTECTION SWITCHING IN PACKET TRANSPORT SYSTEM

(71) Applicant: Electronics and Telecommunications Research Institute, Daejeon (KR)

(72) Inventors: YongWook Ra, Daejeon (KR); Tae Kyu Kang, Daejeon (KR); Chang-Ho Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 343 days.

(21) Appl. No.: 14/171,236

(22) Filed: Feb. 3, 2014

(65) Prior Publication Data

US 2015/0016245 A1 Jan. 15, 2015

(30) Foreign Application Priority Data

Jul. 11, 2013 (KR) ........................ 10-2013-0081830

(51) Int. Cl.
*H04L 12/26* (2006.01)
*H04L 12/703* (2013.01)
*H04L 12/707* (2013.01)
*H04L 12/24* (2006.01)

(52) U.S. Cl.
CPC ........... *H04L 45/28* (2013.01); *H04L 41/0654* (2013.01); *H04L 45/22* (2013.01)

(58) Field of Classification Search
None
See application file for complete search history.

(56) References Cited

U.S. PATENT DOCUMENTS

| 7,486,613 | B2 * | 2/2009 | Kim | H04Q 11/0478 370/222 |
| 7,839,795 | B2 | 11/2010 | Felkar et al. | |
| 8,565,071 | B2 * | 10/2013 | He | H04L 12/42 370/222 |
| 2004/0170128 | A1 * | 9/2004 | Takamichi | H04L 41/06 370/245 |
| 2010/0135291 | A1 | 6/2010 | Martin et al. | |
| 2011/0286324 | A1 * | 11/2011 | Bellagamba | H04L 41/0677 370/219 |

FOREIGN PATENT DOCUMENTS

KR 10-0428762 B1 4/2004

OTHER PUBLICATIONS

International Telecommunication Union, "Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Transport" ITU-T G.8031/Y.1342, Jun. 2011.

* cited by examiner

*Primary Examiner* — Kwang B Yao
*Assistant Examiner* — Hardikkumar Patel
(74) *Attorney, Agent, or Firm* — Rabin & Berdo, P.C.

(57) ABSTRACT

In order to perform protection switching of a frame that is transmitted and received between a packet processor and a host processor, when an input frame is a receiving frame and a signal failure has occurred, by transporting a message including a protection switching command to a packet processor, protection switching is performed. Information representing that protection switching is performed is recorded in a header of the receiving frame, and a frame including a message including a corresponding header is transported to the host processor.

16 Claims, 6 Drawing Sheets

METHOD AND APPARATUS FOR PROTECTION SWITCHING IN PACKET TRANSPORT SYSTEM

CROSS-REFERENCE TO RELATED APPLICATION

This application claims priority to and the benefit of Korean Patent Application No. 10-2013-0081830 filed in the Korean Intellectual Property Office on Jul. 11, 2013, the entire contents of which are incorporated herein by reference.

BACKGROUND OF THE INVENTION (a) Field of the Invention

The present invention relates to a method and apparatus for protection switching. More particularly, the present invention relates to a method and apparatus for protection switching in a packet transport system.

(b) Description of the Related Art

Due to popularization of the Internet and integration of wired and wireless Internet, data traffic has increased, and a limitation exists in housing a high quality service such as IP-TV with an existing complicated network. Accordingly, methods of a transmitting service that provides extension and end-to-end quality of service (QoS) using a data link layer such as a multi-protocol label switching-transport profile (MPLS-TP) of an Internet Engineering Task Force (IETF), IEEE 802.1ah (provider backbone bridging (PBB)), and IEEE 802.1ag (provider backbone bridging-traffic engineering (PBB-TE) are being studied.

In order for a packet transport network to provide a non-stop service to users by stably operating and to maximize efficiency of a network, a method of processing failure occurrence or performance deterioration is necessary. Such a method includes a method of protection switching and restoration.

Protection switching is a method of resuming traffic as soon as possible when traffic is stopped, when a failure occurs in a network. Protection switching is classified into linear protection switching and ring protection switching according to topology of a network, and the linear protection switching is classified into 1+1, 1-to-1, 1-to-N, or M-to-N protection switching.

Protection switching basically divides paths between nodes into a working path and a protection path, and when a failure does not exist, traffic is carried with the working path, and when a failure occurs in a network or when a path is changed according to operator control, traffic is carried through the protection path.

A restoration method restores a stopped service to an original service using an available path and resource in a network after a failure occurs.

Protection switching in such a packet transport system is performed using an automatic protection switching (APS) frame and an operation, administration, and maintenance (OAM) frame including protection switching protocol message information between a packet processor, a host processor, and a main processor that are mounted within a line card of the packet transport system.

However, by processing protection switching in software having a relatively lower speed based on a processor, a continuity check and connectivity verification requiring real-time processing is not efficiently performed, and when a packet is lost according to a specific failure situation, performance of a packet transport system may be deteriorated.

SUMMARY OF THE INVENTION

The present invention has been made in an effort to provide a method and apparatus having advantages of performing quick and stable protection switching when transporting a packet in a packet transport system.

An exemplary embodiment of the present invention provides an apparatus and method for protection switching that enable a packet processor to change a packet path by quickly transporting a frame including a protection switching command message to the packet processor between the packet processor and a host processor in a packet transport system.

The method of performing protection switching of a frame that is transmitted and received between a packet processor and a host processor includes: determining, when an input frame is a receiving frame, whether a signal failure has occurred in the receiving frame; generating, if a signal failure has occurred in the receiving frame, a message including protection switching command information and transporting the protection switching command message to the packet processor; and recording information representing that protection switching is performed in a header of the receiving frame and transporting a frame including a message including the header to the host processor.

The method may further include: performing, by the packet processor, protection switching, when the packet processor receives the protection switching command message; and updating, by the host processor, a switching state, when information representing that protection switching is performed is included in a header of a message of the frame.

The determining of whether a signal failure has occurred may include extracting a preset field from the receiving frame, and detecting whether a signal failure has occurred in the receiving frame based on information that is included in the extracted field.

The detecting of whether a signal failure has occurred may include determining that a signal failure has occurred in the receiving frame when the receiving frame is a message according to a preset protocol and when state information representing that an error exists in a frame is included in the extracted field.

The transporting of the protection switching command message may include transporting the protection switching command message to the packet processor, when a loss of continuity (LOC) indication signal is received from the packet processor.

The method may further include not changing, if a signal failure does not occur in the receiving frame, a header of the receiving frame and transporting the frame to the host processor.

The method may further include buffering, when a protocol related message is received from the host processor, the received protocol related message. The transporting of the protection switching command message may include selectively processing the buffered protocol related message and the protection switching command message, and transporting the processed message to the packet processor.

Another embodiment of the present invention provides a protection switching apparatus for performing protection switching of a frame that is transmitted and received between a packet processor and a host processor, the protection switching apparatus including: an interface unit that performs interfacing of a frame that is transmitted and received between the packet processor and the host processor; a signal failure (SF) detection unit that determines whether a signal failure has occurred in the receiving frame, when an input frame is a receiving frame; a protection processor that generates a protection switching command, if a signal failure has occurred in the receiving frame; a message generator that generates a message including the protection switching command; and a transmitting arbitration unit that transports the protection switching command message to the packet processor through the interface unit and that transports a protocol related message that is received from the host processor through the interface unit to the packet processor.

The protection switching apparatus may further include a message delivery and generation unit that records information representing that protection switching is performed in a header of the receiving frame and that transports a frame including a message including the header to the host processor, if a signal failure has occurred.

The SF detection unit may provide a control signal including protection switching command information to the message delivery and generation unit and may record information in a header of the receiving frame, if the signal failure has occurred.

The protection switching apparatus may further include: a parsing unit that extracts a preset field from the receiving frame; and a classification unit that classifies the receiving frame into a packet for detecting a signal failure based on information that is included in the extracted field.

The classification unit may transport the receiving frame to the SF detection unit, when the receiving frame is a message according to a preset automatic protection switching (APS) protocol and when state information representing that an error exists is included in the extracted field.

The classification unit may transport the receiving frame and the request/state field value to the SF detection unit, when a request/state field value represents signal fail for protection (SF-P) or signal fail for working (SF-W) in the extracted fields.

The classification unit may transport the receiving frame and an LOC indication signal to the SF detection unit, when the LOC indication signal is received from the packet processor.

The SF detection unit may transport the receiving frame while notifying failure detection to the protection processor, when a request/state field value that is provided from the classification unit is SF-P or SF-W or when the LOC indication signal is received from the classification unit.

The protection switching apparatus may further include a transmitting buffer that buffers the protocol related message that is received from the host processor and that transports the protocol related message to the transmitting arbitration unit.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, a method and apparatus for protection switching according to an exemplary embodiment of the present invention will be described.

Figure 1:
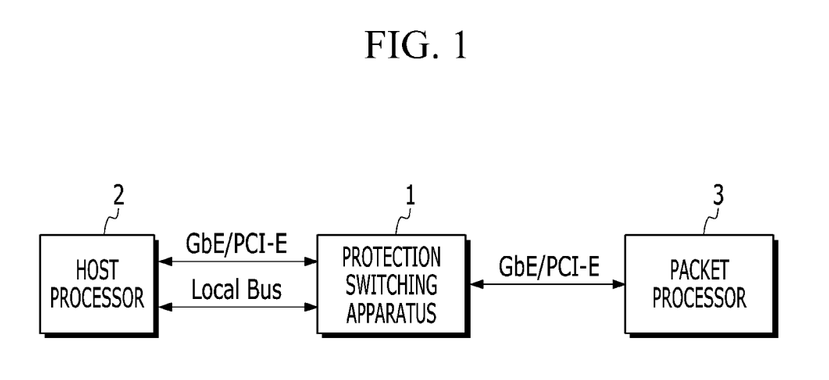
FIG. 1 is a diagram illustrating a packet transport system to which a protection switching apparatus is applied according to an exemplary embodiment of the present invention.

FIG. 1 is a diagram illustrating a packet transport system to which a protection switching apparatus is applied according to an exemplary embodiment of the present invention. A protection switching apparatus 1 according to an exemplary embodiment of the present invention is positioned between a host processor 2 and a packet processor 3 to perform protection switching of an automatic protection switching (APS) frame that is transmitted and received between the host processor 1 and the packet processor 3 and a packet that is transported through packet processors between packet transport systems according to loss of continuity (LOC) information.

In such a packet transport system, the host processor 2 uses a universal processor, communicates with a main processor (not shown) that controls the packet transport system, processes related operation, administration, and maintenance (OAM) messages, and operates a protection switching protocol.

The packet processor 3 performs a packet processing and performs packet processing using custom ASIC or a network processor. The packet processor 3 performs transmitting and receiving processing of an OAM packet related connectivity check message (CCM), and transmits signal information such as LOC to the protection switching apparatus 1.

The protection switching apparatus 1 according to an exemplary embodiment of the present invention processes related frames through a physical interface (e.g., gigabit Ethernet (GbE)/serial gigabit media independent interface (SGMII) or peripheral component interconnect-express (PCI-E)) between the host processor 2 and the packet processor 3.

Figure 2:
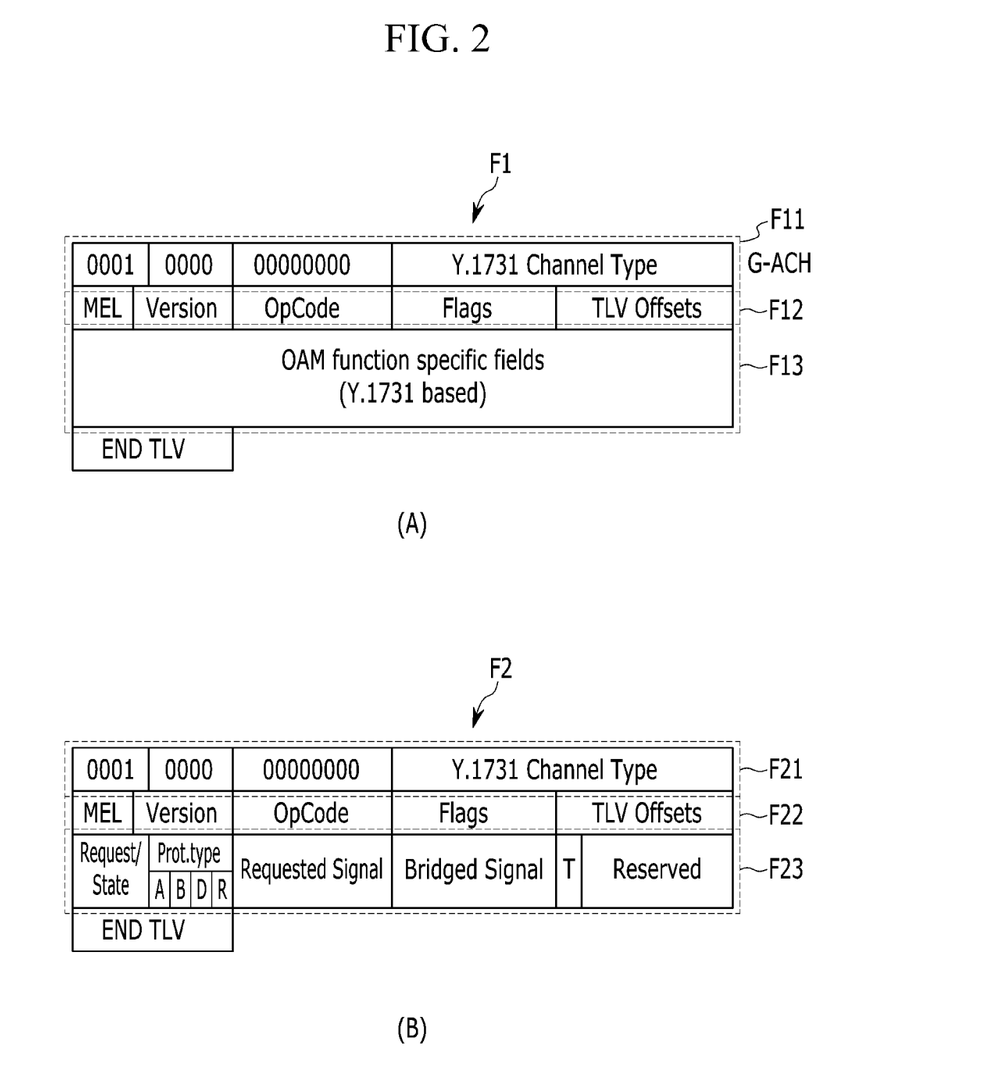
FIG. 2 is a diagram illustrating a frame structure for protection switching according to an exemplary embodiment of the present invention.

FIG. 2 is a diagram illustrating a frame structure for protection switching according to an exemplary embodiment of the present invention. FIG. 2 represents an OAM and APS frame form according to G.8113.1 recommendation. In ITU-T recommendations G.8031/Y.1342, APS protocol and linear protection switching mechanisms are defined. Here, the frame represents an OAM and APS frame.

In regulation of APS protocol and linear protection switching, protection switching is classified into linear 1+1 protection switching and linear 1-to-1 protection switching. The linear 1+1 protection switching operates by unidirectional or bi-directional switching, and the linear 1-to-1 protection switching operates by bi-directional switching. Bi-directional switching requires an APS coordination protocol so that selectors of a direction may select the same entity, and unidirectional linear 1+1 protection switching does not require an APS coordination protocol.

FIG. 2 (A) represents a structure of an OAM frame, and FIG. 2 (B) represents a frame structure of an APS case in the OAM frame.

In a frame, i.e., a first frame F1, which is shown in FIG. 2 (A), a first header portion F11 that is formed with 4 bytes represents a generic associated channel header (G-ACH) after a g-ach label (GAL) of a multi-protocol label switching-transport profile (MPLS-TP) or represents an associated channel header (ACH) after a pseudo-wire (PW) label.

A second header portion F12 represents an OAM frame header and includes a plurality of fields (OP-code, type length value (TLV) offset, and flags). A field portion F13 represents an OAM specific field, and a payload length may be varied.

A frame, i.e., a second frame F2 that is shown in FIG. 2 (B) includes a first header portion F21 and a second header portion F22 similar to the first frame F1, and shows a case in which an OpCode of the first frame F1 is APS.

When an operation code field, i.e., an OpCode of the second header portion F22 represents APS, a field portion F23 includes APS specific fields and includes a request/state field, a protection type field, a requested signal field, a bridged signal field, and a flag field.

The request/state field is formed on a priority order basis, and a state/command having a high priority order may change a state having a lower priority order. This field has a priority order for states in the following order.

Lockout of Protection (LO-P)>Signal Fail for Protection (SF-P)>Forced Switch (FS)>Signal Fail for Working (SF-W)>Signal Degrade (SD)>Manual Switch (MS)>Deprecated>Wait to Restore (WTR)>Exercise (EXER)>Reverse Request (RR)>Do Not Revert (DNR)>No Request (NR).

In this field, each state and requests that are described above are known technology so a detailed description thereof will be omitted.

Figure 3:
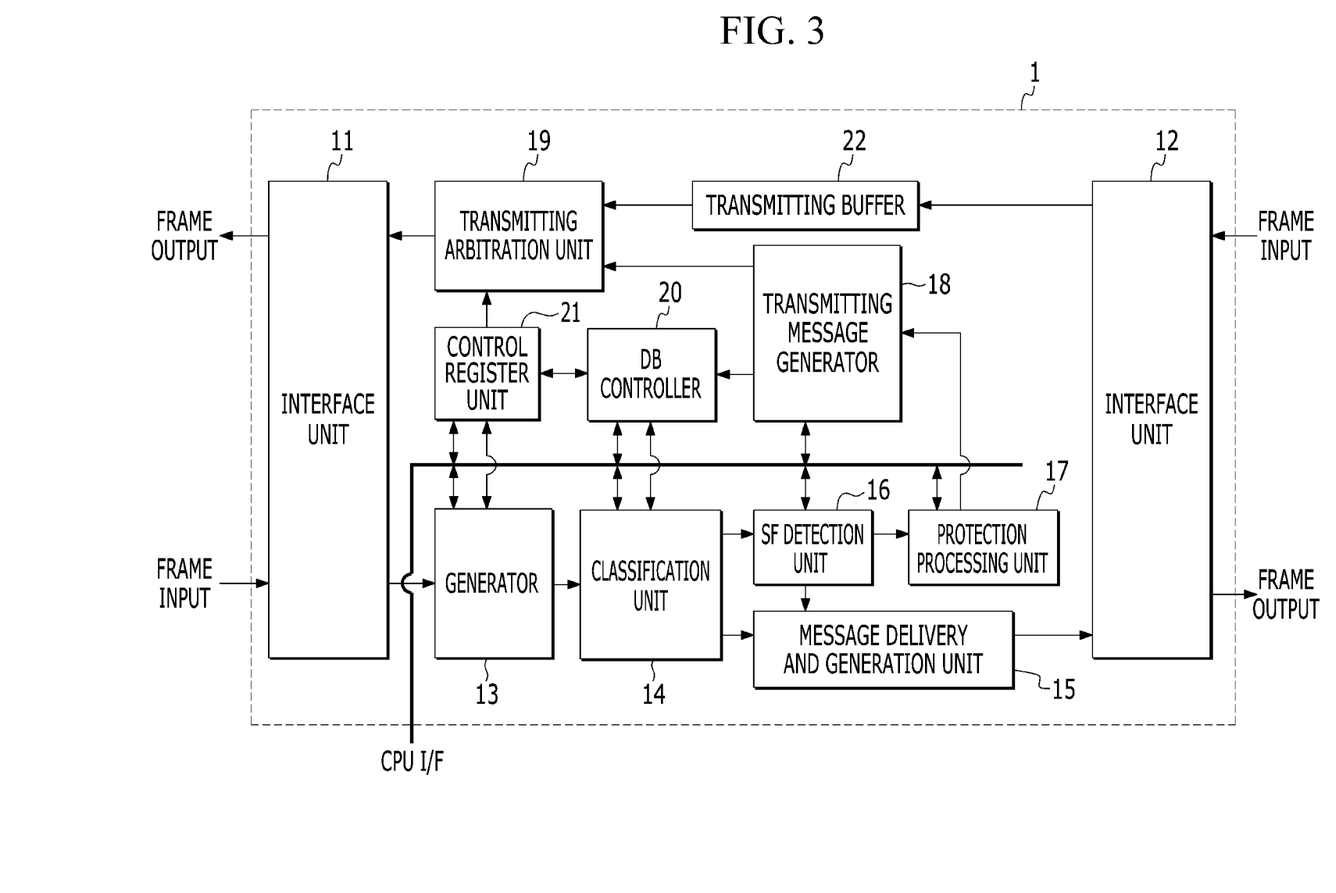
FIG. 3 is a block diagram illustrating a structure of a protection switching apparatus according to an exemplary embodiment of the present invention.

FIG. 3 is a block diagram illustrating a structure of a protection switching apparatus according to an exemplary embodiment of the present invention.

As shown in FIG. 3, the protection switching apparatus 1 according to an exemplary embodiment of the present invention includes interface units 11 and 12, a parsing unit 13, a classification unit 14, a message delivery and generation unit 15, a signal failure (SF) detection unit 16, a protection processing unit 17, a transmitting message generator 18, a transmitting arbitration unit 19, a database (DB) controller 20, a control register unit 21, and a transmitting buffer 22. At least one among the units 11~22 may be included in a processor.

The interface units 11 and 12 transmit/receive a frame (OAM frame) between the packet processor 3 and the host processor 2, and may be formed with a physical interface such as GbE/SGMII/PCI-E.

The parsing unit 13 receives a frame via the interface unit 11 from the packet processor 3, checks the received frame, and extracts and stores fields (a channel type (Y.1731 or G.8113.1), an OP-code, a request/state field, a requested signal field, a bridged signal field, and a flag field value of the first header portion F21 of FIG. 2) that are used by the classification unit 14 from a received frame. Further, the parsing unit 13 transports the received frame to the classification unit 14.

The classification unit 14 receives fields that are extracted by the parsing unit 13 and checks internal tables that are internally stored and managed in order to classify a protection group (each working path and protection path on an index basis) corresponding to the received frame. The classification unit 14 updates the internal table, as needed. Further, the classification unit 14 processes an input frame without change based on an extracted field that is transported to the parsing unit 13 and the internal table, and determines whether to transmit the input frame to the host processor 2 or to transport the input frame to the SF detection unit 16.

As shown in FIG. 2, the classification unit 14 checks a channel type (Y.1731 or G.8113.1) of the first header portion F21, views an OPcode according to the channel type, and checks whether the received frame is a frame according to an APS protocol. If the received frame is not a frame according to an APS protocol, in order to directly transmit the received frame to the host processor 2, the classification unit 14 transports the received frame to the message delivery and generation unit 15 without change. When an LOC indication signal is transmitted from the packet processor 3, the classification unit 14 transports the LOC indication signal and the frame to the SF detection unit 16, or when an OPcode value of the received frame represents APS, and when a request/state field value of a field portion F23 of the receive frame represents SF-P or SF-W, transports a frame including a request signal field value to the SF detection unit 16, and in other cases, in order to directly transmit the frame to the host processor 2 without a separate change, the classification unit 14 transports the frame to the message delivery and generation unit 15. In this way, when state information (e.g., SF-P or SF-W) representing that an error exists is included in a frame that is input to an extracted field, the classification unit 14 transports the input frame to the SF detection unit 16, enables checking an SF with reference to a requested signal field, transports the frame to the message delivery and generation unit 15, updates the frame according to an SF check result, and transmits the frame to the host processor 2.

The message delivery and generation unit 15 transports a frame including a message that is output from the classification unit 14 to the host processor 2 through the interface unit 12 without changing a header. Further, when the message delivery and generation unit 15 receives an input of a control signal from the SF detection unit 16, the message delivery and generation unit 15 updates a header of a frame including a message that is output from the classification unit 14 so as to represent that a protection switching command of a signal failure (sf) is processing, and transports the head to the host processor 2 through the interface unit 12.

The SF detection unit 16 checks whether an LOC indication signal is transported from the classification unit 14 or whether state information of a receiving frame has an SF, i.e., whether an SF (e.g., when a request/state field value represents SF-P or SF-W) has occurred in an APS frame, and when the LOC indication signal is transported or when an SF is detected in the frame, the SF detection unit 16 transports a corresponding frame to the protection processor 17 and notifies that an SF is detected. When the LOC indication signal is transported or when an SF is detected in the frame, the SF detection unit 16 transports a control signal including protection switching command information (including bridge/selector position information for protection switching) to the message delivery and generation unit 15, and enables the message delivery and generation unit 15 to update a header of a message.

The protection processor 17 generates a protection switching performing command so that the packet processor 3 performs protection switching according to a failure detection notification from the SF detection unit 16.

The transmitting message generator 18 receives a protection switching performing command that is transmitted from the protection processor 17, and generates a message, i.e., a frame including the protection switching command. The frame may be varied and generated on an index basis according to a received command including a maintenance end point (MEP) index and an internal table of the DB controller 20. The generated frame is transported to the transmitting arbitration unit 19.

The transmitting arbitration unit 19 performs transmitting arbitration of a received protocol related transmitting message that is transmitted from the host processor 2 through the interface unit 12 and a frame that is generated in the transmitting message generator 18. For convenience of description, a message that is transmitted from the host processor 2 is referred to as a "protocol related message", and a message that is transported from the transmitting message generator 18 is referred to as a "protection switching command message".

When transmission of a protocol related message is selected, the transmitting arbitration unit 19 receives a corresponding protocol related message (entire APS message processing command, except for an SF) from the transmitting buffer 22, transports the corresponding protocol related message to the interface unit 11, and enables the corresponding protocol related message to be transmitted to the packet processor 3. Alternatively, when transmission of a protection switching command message that is generated in the transmitting message generator 18 is selected, the transmitting arbitration unit 19 transports a corresponding message to the interface unit 11, and enables the corresponding message to be transmitted to the packet processor 3.

The DB controller 20 includes DB tables therein. For example, the DB controller 20 includes a maintenance end point database (MEP_DB) table and a remote maintenance end point database (RMEP_DB) table, and provides interface information that is related to an RMEP_index_DB_a and an RMEP_index_DB_b. The DB controller 20 may allocate a specific time slot to every client with an access control method to various DBs.

The control register unit 21 manages a valid signal and field control information on an input frame basis, and transmits and receives a control signal to and from the parsing unit 13 and the DB controller 20.

The transmitting buffer 22 performs a function of holding a protocol related message (APS coordination protocol message) that is transmitted from the host processor 2 in order to transmit in the transmitting arbitration unit 19.

Figure 4:
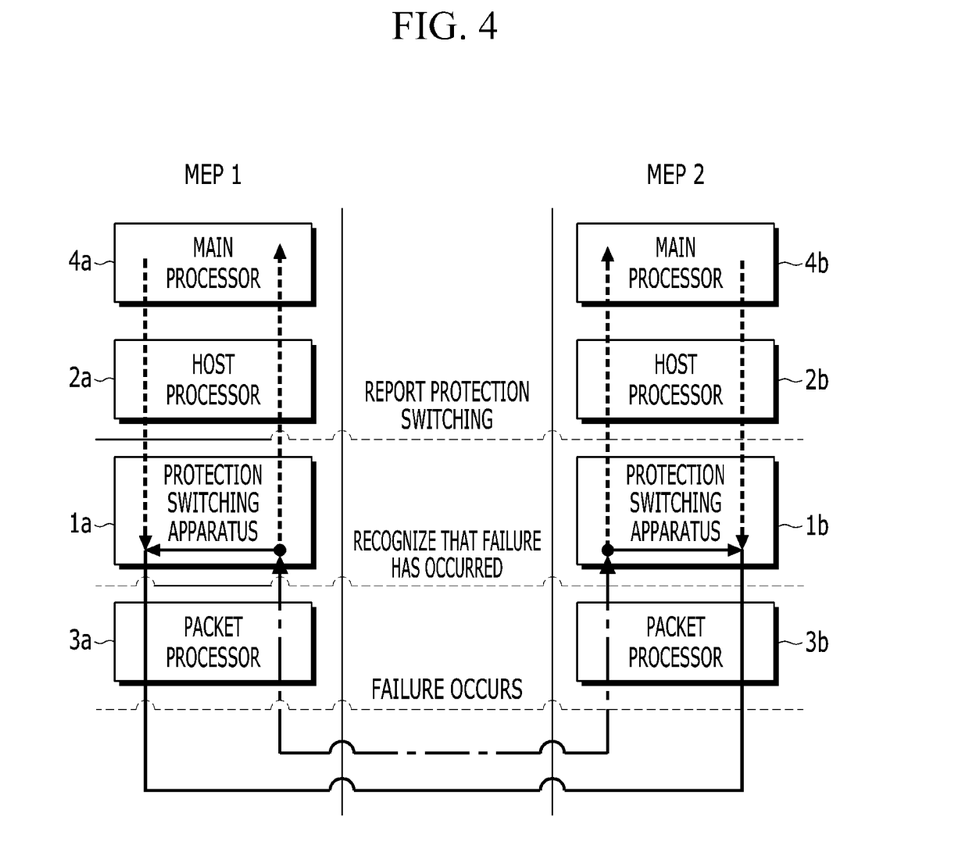
FIG. 4 is a diagram illustrating a process of performing protection switching between both ends using a protection switching apparatus according to an exemplary embodiment of the present invention.

The protection switching apparatus 1 that is formed in such a structure enables to perform packet path protection switching between a plurality of packet transport systems using the packet processor 3 according to whether a signal failure (SF) has occurred between the host processor 2 and the packet processor 3, and protection switching is performed between both ends of the packet processors 3a and 3b that transmit a packet, as shown in FIG. 4.

FIG. 4 is a diagram illustrating a process of performing protection switching between both ends using a protection switching apparatus according to an exemplary embodiment of the present invention.

As shown in FIG. 4, in a process of operating for protection switching at a maintenance end point (MEP) point of both ends, when viewing a hierarchical structure, when a link failure (LOC indication signal) according to a signal failure occurs in the packet processors 3a and 3b or when a request/state field value represents SF-P or SF-W in an APS frame transmitting to protection switching apparatuses 1a and 1b, the protection switching apparatuses 1a and 1b that are installed at both ends, respectively, generate a protection switching command, transmit the protection switching command to the packet processors 3a and 3b, command to change a path, and notify that a path is changed to superordinate host processors 2a and 2b according to occurrence of a failure. The host processors 2a and 2b notify and process another state of APS message that is received from the protection switching apparatuses 1a and 1b as well as notify an APS message including an SF to superordinate main processors 4a and 4b. Further, when a request/state field value that is generated in the main processors 4a and 4b is not SF-P or SF-W, the host processors 2a and 2b transmit a protocol related message processing command to the protection switching apparatuses 1a and 1b. When a protocol related message processing command is transmitted, rather than a transmitted SF from the host processors 2a and 2b, the protection switching apparatuses 1a and 1b arbitrate a transmitting priority order with a protection switching command message when an APS state that is received from the packet processors 3a and 3b is SF (SF-P or SF-W) or when an LOC indication signal is sensed, and transmit a frame including a corresponding message to the packet processors 3a and 3b.

Hereinafter, a method of performing protection switching according to an exemplary embodiment of the present invention will be described.

Figure 5:
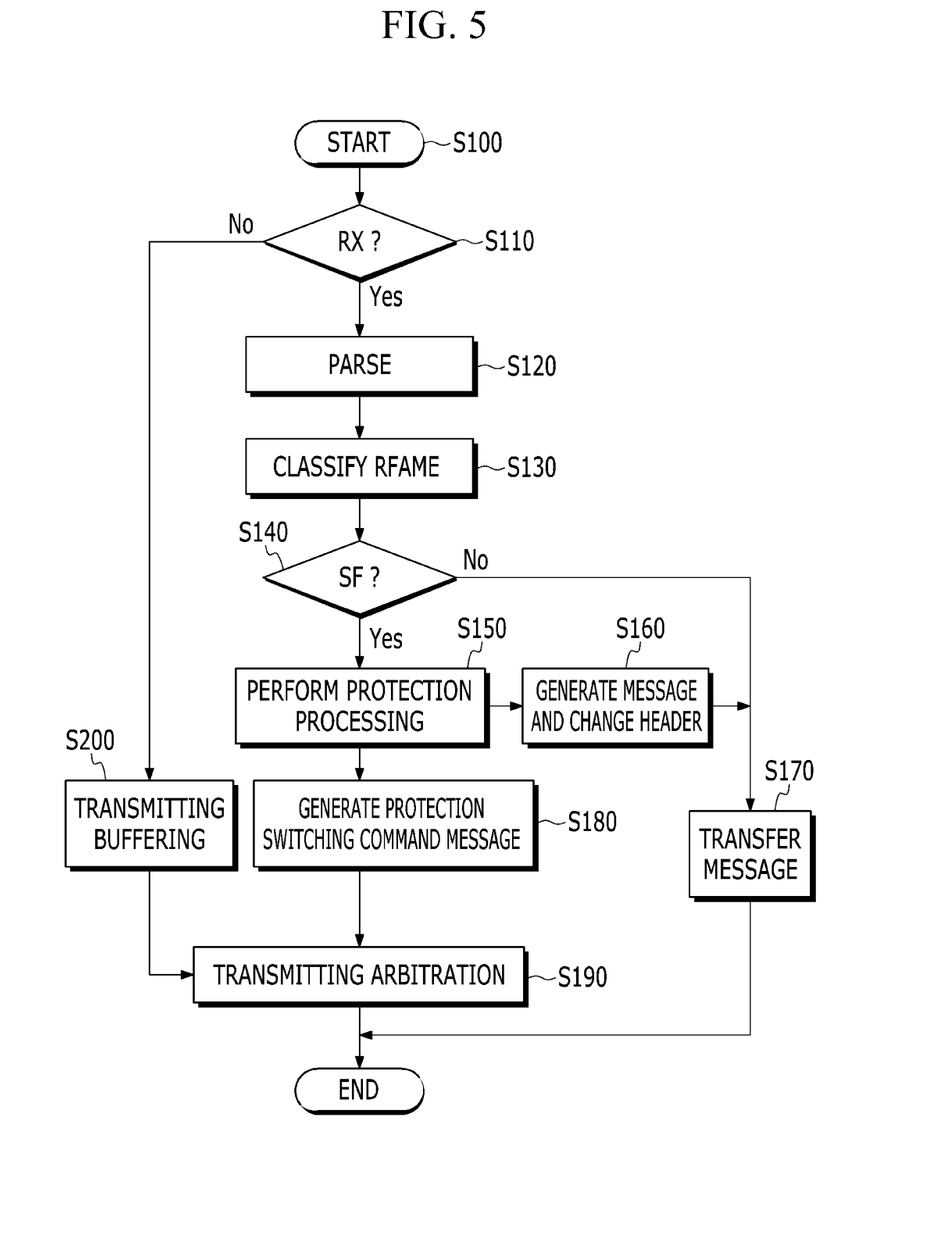
FIG. 5 is a flowchart illustrating a method of performing protection switching according to an exemplary embodiment of the present invention.

FIG. 5 is a flowchart illustrating a method of performing protection switching according to an exemplary embodiment of the present invention.

As shown in FIG. 5, when a frame is input, the protection switching apparatus 1 determines whether the frame is a receiving frame Rx or a transmitting frame Tx (S110). If the received frame is a receiving frame that is transmitted from another apparatus to be received by the packet processor 3, the protection switching apparatus 1 parses the receiving frame Rx and extracts related information (S120).

The protection switching apparatus 1 classifies the receiving frame Rx based on the extracted information (S130). When the receiving frame Rx is a receiving frame Rx in which an SF has occurred, the protection switching apparatus 1 checks whether an SF has occurred in which protection group of the receiving frame Rx (S140).

If an SF has occurred in the receiving frame Rx, the protection switching apparatus 1 performs protection processing (S150). Accordingly, the protection switching apparatus 1 performs a change that records information representing that protection switching is performing in a header of the receiving frame (S160), and transports a frame including a message including the changed header to the superordinate host processor 2 (S170).

Further, the protection switching apparatus 1 generates protection switching command information that enables to perform protection switching in the packet processor 3, having provided the receiving frame Rx, and generates a protection switching command message including the protection switching command information (S180). The protection switching apparatus 1 transmits the protection switching command message to the packet processor 3 through transmitting arbitration (S190).

When a frame that is input at step S100 is not a receiving frame Rx but a transmitting frame Tx, i.e., when a frame is a transmitting frame Tx that is received from the host processor 2 to be transmitted to another packet transport system through the packet processor 3, the protection switching apparatus 1 performs transmitting buffering that stores at the transmitting buffer 22 (S200) and transmits the transmitting frame Tx to the packet processor 3 through transmitting arbitration.

A method of performing protection switching according to an exemplary embodiment of the present invention that is performed as described above will be described in detail by interlocking with a packet processor and a host processor.

Figure 6:
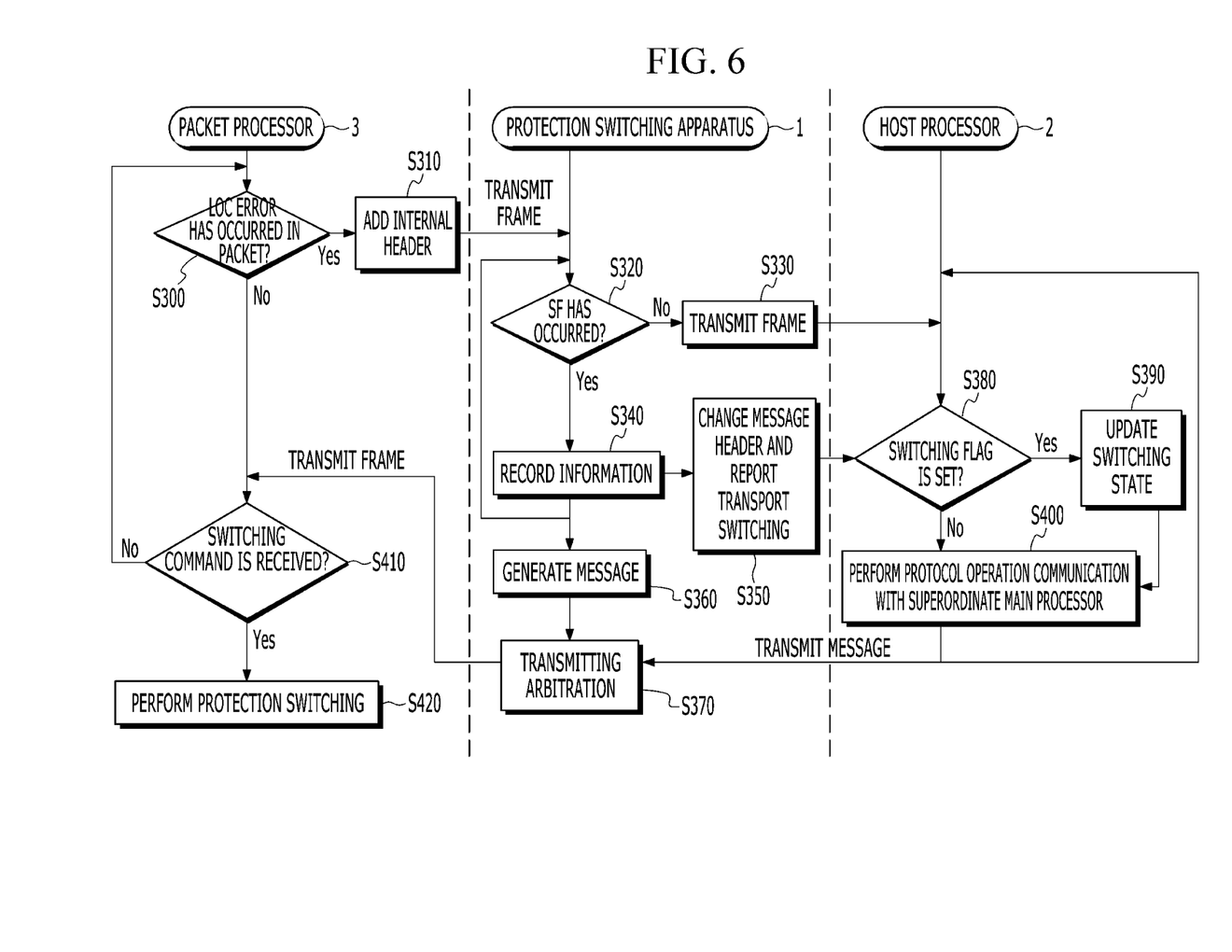
FIG. 6 is a flowchart illustrating a method of performing protection switching that is interlocked with processors according to an exemplary embodiment of the present invention.

FIG. 6 is a flowchart illustrating a method of performing protection switching that is interlocked with processors according to an exemplary embodiment of the present invention.

As shown in FIG. 6, the method of performing protection switching is divided into three layers of the host processor 2, the protection switching apparatus 1, and the packet processor 3.

The packet processor 3 receives a frame (OAM packet) that is transmitted from another packet transport system, checks a continuity check message (CCM) interval of the received packet, and checks whether an LOC error has occurred (S300). If a packet error has occurred, the packet processor 3 adds an internal header (LOC indication signal) including error information to an originally received packet, and transmits a corresponding frame to the protection switching apparatus 1 (S310).

The protection switching apparatus 1 receives a frame from the packet processor 3, and checks whether an SF has occurred based on field information that is extracted from the received frame (S320). If an SF does not occur, the protection switching apparatus 1 transmits the received frame to the host processor 2 without change (S330).

If an SF has occurred, in order to perform protection switching, the protection switching apparatus 1 records information representing that protection switching is performed in a header of the received frame (S340). That is, the protection switching apparatus 1 sets switching flag information notifying that a protection switching command was performed in a header of an existing frame. The protection switching apparatus 1 transports a receiving frame having a changed header to the superordinate host processor 2 (S350). The protection switching apparatus 1 generates a protection switching command message to enable a packet processor 3 to perform protection switching (S360), performs transmitting arbitration of the generated protection switching command message and a protocol related command message that is received from the host processor 2, and transmits the message in which transmitting arbitration is performed to the packet processor 3 (S370).

When the host processor 2 receives the frame from the protection switching apparatus 1, the host processor 2 determines whether a switching flag is set at the received frame (S380), and if a switching flag is set at the received frame, the host processor 2 determines that protection switching is performed, as an SF (SF-P or SF-W) occurs, and updates a protection switching state (S390). The host processor 2 performs protocol operation communication with a superordinate main processor (S400). If a switching flag is not set at the received frame, when the host processor 2 has an entire state information value, not SF-P and SF-W such as a forced switch (FS), signal degrade (SD), and a manual switch (MS) with reference to a request/state field value without separate state update, the host processor 2 performs protocol operation communication with the superordinate main processor (S400).

The packet processor 3 determines whether a frame including a protection switching command message or a protocol related command message according to an SF is received from the protection switching apparatus 1 (S410), and if a frame including a protection switching command message or a protocol related command message according to an SF is received from the protection switching apparatus 1, the packet processor 3 performs protection switching (S420).

According to an exemplary embodiment of the present invention, in a packet transport system, when a failure occurs on a path belonging within a protection group, by selectively performing hardware-based protection switching and software-based protection switching according to a failure occurrence type, protection switching is more rapidly performed.

Therefore, path management on each transmitting service basis and protection switching to a replacement path according to path management can be rapidly processed, and traffic damage that is generated when performing only software-based protection switching can be reduced.

An exemplary embodiment of the present invention may not only be embodied through an apparatus and/or method, but may also be embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a packet transport system to perform protection switching, the packet transport system including
   a packet processor,
   a protection switching apparatus, and
   a host processor,
the method comprising:
   checking, by the protection switching apparatus, whether a signal failure has occurred in a receiving frame that is sent from another switching apparatus for receipt by the packet processor;
   generating, by the protection switching apparatus, responsive to the signal failure that has occurred in the receiving frame, a protection switching command message comprising protection switching command for the packet processor to perform the protection switching;
   recording, by the protection switching apparatus, upon generating the protection switching command message and in a header of the receiving frame, information representing that the protection switching is to be performed by the packet processor, and transporting an updated receiving frame comprising the header having the recorded information to the host processor;

receiving, by the protection switching apparatus, a protocol related command message sent from the host processor; and performing, by the protection switching apparatus, arbitration for transmitting the protection switching command message generated by the protection switching apparatus or the protocol related command message sent from the host processor, and transmitting one of the protection switching command message and the protocol related command message in accordance with the arbitration to the packet processor so that the packet processor performs the protection switching according to the transmitted message.

2. The method of claim 1, further comprising:

updating, by the host processor, a protection switching state, upon receiving the header having the recorded information representing that the protection switching is to be performed.

3. The method of claim 1, wherein the checking whether a signal failure occurs comprises:

extracting information of a preset field from the receiving frame; and detecting whether the signal failure has occurred in the receiving frame based on the information that is included in the extracted preset field.

4. The method of claim 3, wherein the detecting whether the signal failure has occurred comprises checking whether the receiving frame includes a message according to a preset protocol and whether state information representing that an error exists in the receiving frame is included in the extracted preset field.

5. The method of claim 1, wherein the transporting of the protection switching command message comprises transporting the protection switching command message to the packet processor, upon receiving a loss of continuity (LOC) indication signal from the packet processor.

6. The method of claim 1, further comprising transporting to the host processor the receiving frame without changing the header of the receiving frame upon detecting that the signal failure does not occur in the receiving frame.

7. The method of claim 1, further comprising receiving and buffering the protocol related command message that is sent from the host processor, wherein the performing arbitration includes selectively processing the buffered protocol related command message and the protection switching command message, and transporting the processed message to the packet processor.

8. A protection switching apparatus included in a packet transport system for performing protection switching, the packet transport system including a packet processor and a host processor, the protection switching apparatus comprising:

an interface unit that performs interfacing of a frame that is transmitted and received between the packet processor and the host processor;

a signal failure (SF) detection unit that determines whether a signal failure has occurred in a receiving frame that is sent from another switching apparatus for receipt by the packet processor;

a protection processor that generates a protection switching command that enables the packet processor to perform protection switching responsive to occurrence of the signal failure in the receiving frame;

a message generator that generates a protection switching command message comprising the protection switching command;

a message delivery and generation unit that records in a header of the receiving frame information representing that the protection switching is to be performed, responsive to detection of the signal failure by the SF detection unit, and transports a frame including the header having the recorded information to the host processor, and a transmitting arbitration unit that arbitrates the protection switching command message generated by the protection processor and a protocol related message sent from the host processor, and transports one of the protection switching command message and the protocol related command message in accordance with the arbitration to the packet processor through the interface unit.

9. The protection switching apparatus of claim 8, wherein the message delivery and generation unit records the information in the header of the frame upon receiving a control signal including the protection switching command from the SF detection unit.

10. The protection switching apparatus of claim 8, further comprising:

a parsing unit that extracts information of a preset field from the receiving frame; and a classification unit that classifies the receiving frame into a packet for detecting the signal failure based on the information that is included in the extracted preset field.

11. The protection switching apparatus of claim 10, wherein the classification unit transports the receiving frame to the SF detection unit, when the receiving frame includes a message according to a preset automatic protection switching (APS) protocol and when state information representing that an error exists is included in the extracted preset field.

12. The protection switching apparatus of claim 11, wherein the classification unit transports the receiving frame and a request/state field value to the SF detection unit, when the request/state field value represents signal fail for protection (SF-P) or signal fail for working (SF-W) in the extracted preset field.

13. The protection switching apparatus of claim 10, wherein the classification unit transports the receiving frame and a loss of continuity (LOC) indication signal to the SF detection unit, when the LOC indication signal from the packet processor is received.

14. The protection switching apparatus of claim 12, wherein the SF detection unit transports the receiving frame while notifying failure detection to the protection processor, when the request/state field value that is provided from the classification unit is SF-P or SF-W or when a loss of continuity (LOC) indication signal from the classification unit is received.

15. The protection switching apparatus of claim 8, further comprising a transmitting buffer that buffers the protocol related message that is received from the host processor and that transports the protocol related message to the transmitting arbitration unit.

16. A packet transport system, comprising the packet processor, the host processor and the protection switching apparatus recited in claim 8.

* * * * *